US008469689B2

(12) United States Patent
Yamamoto et al.

(10) Patent No.: US 8,469,689 B2
(45) Date of Patent: Jun. 25, 2013

(54) INDUSTRIAL PRODUCT PRODUCTION FACILITY AND PRODUCTION METHOD

(75) Inventors: Akihiko Yamamoto, Tokyo (JP); Junichi Nakatani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 12/999,139

(22) PCT Filed: May 29, 2009

(86) PCT No.: PCT/JP2009/059906
§ 371 (c)(1),
(2), (4) Date: Dec. 15, 2010

(87) PCT Pub. No.: WO2009/154068
PCT Pub. Date: Dec. 23, 2009

(65) Prior Publication Data
US 2011/0091589 A1     Apr. 21, 2011

(30) Foreign Application Priority Data
Jun. 19, 2008  (JP) .................. 2008-159979

(51) Int. Cl.
*B29C 45/17*          (2006.01)
(52) U.S. Cl.
USPC ................... 425/185; 425/190; 425/192 R
(58) Field of Classification Search
USPC .................... 425/185, 190, 192 R
See application file for complete search history.

(56) References Cited

U.S. PATENT DOCUMENTS

| 4,529,371 A | * | 7/1985 | Nickley ................... 425/186 |
| 4,555,228 A | * | 11/1985 | Nishiike et al. ............ 425/185 |
| 5,040,965 A | * | 8/1991 | Baird ....................... 425/186 |
| 5,580,587 A | * | 12/1996 | Leonhartsberger et al. .. 425/183 |
| 2003/0138513 A1 | * | 7/2003 | Matsuura et al. ........... 425/186 |

FOREIGN PATENT DOCUMENTS

| JP | 02-063618 | 3/1990 |
| JP | 03-104610 | 5/1991 |
| JP | 03-164221 | 7/1991 |
| JP | 6015191 B | 3/1994 |
| JP | 06-143291 | 5/1994 |
| JP | 07-088898 | 4/1995 |
| JP | 09-164558 | 6/1997 |
| JP | 10044157 | 2/1998 |

(Continued)

*Primary Examiner* — Joseph S Del Sole
*Assistant Examiner* — James Sanders
(74) *Attorney, Agent, or Firm* — Rankin, Hill & Clark LLP

(57) ABSTRACT

Provided are an industrial product production facility and a production method suitable for manufacturing a wide variety of products in small quantities. A production facility (P) is provided with an injection molding machine (2), a first mold exchanging machine (3), and a device (4) for automatically opening and closing molds. The injection molding machine (2) molds a synthetic resin product by using a pair of molds (1a, 1b). The first mold exchanging machine (3) moves the pair of molds (1a, 1b) in an X direction. The first mold exchanging machine (3) is moveable in a Y direction. The device (4) for automatically opening and closing molds is disposed adjacent to the first mold exchanging machine (3) and opposite to the injection molding machine (2). The device (4) for automatically opening and closing molds separates at least the pair of molds (1a, 1b) so that rust-preventive oil on molding surfaces of the molds (1a, 1b) can be either removed or applied while gripping the pair of molds.

3 Claims, 4 Drawing Sheets

FOREIGN PATENT DOCUMENTS

| | | |
|---|---|---|
| JP | 10146838 | 6/1998 |
| JP | 2001026039 | 1/2001 |
| JP | 2005-022256 | 1/2005 |
| JP | 2005-246634 | 9/2005 |

* cited by examiner

INDUSTRIAL PRODUCT PRODUCTION FACILITY AND PRODUCTION METHOD

TECHNICAL FIELD

The present invention relates to an industrial product production facility and a production method. In particular, it relates to a facility that produces and a method of producing industrial products with a pair of molds used in a molding machine.

BACKGROUND ART

For example, a bumper, which is an external component of an automobile, an instrument panel (dashboard), which is an interior component of an automobile, or the like have been molded synthetic resin (plastic) products. An injection molding machine is generally used to produce such synthetic resin molded products. An injection molding machine injects raw resin that has been thermally melted into a cavity provided between a pair of molds, and molds a synthetic resin product that has cooled and solidified.

Conventionally, production facilities that use such molds for injection molding machines are made so as to have a maintenance area of molds provided in a vicinity of a molding machine area in which injection molding machines are arranged, and the molds are adjusted in this maintenance area. Then, work is performed in a maintenance area in a state in which, among the fixed molds and moveable molds, the molds requiring maintenance have been turned up.

On the other hand, horizontal injection molding machines are arranged in a state in which the fixed mold and the moveable mold are in parallel; therefore, an operation to invert the molds has been necessary in a molding machine area and a maintenance area. In addition, the molds are moved between the maintenance area and the injection molding machine using a crane.

However, when the molds are conveyed by a crane between the maintenance area and the injection molding machine, it is necessary to assist with manpower such as in hook hoisting of the crane, and automating is difficult. Therefore, a production facility that also includes conveyance of molds in the molding machine area and is designed so as to make automation thereof possible has been published (e.g., refer to Patent Document 1).

The production facility according to Patent Document 1 includes a molding machine area and a maintenance area. The molding machine area has a stocker that stores molds, an injection molding machine, and a setup truck that is made to be drivable between the stocker and the injection molding machine, as well as having a placement surface of molds. Then, the molds are exchanged via the setup truck. The maintenance area is arranged to be adjacent to the molding machine area, and the molds are adjusted therein.

In addition, the production facility according to Patent Document 1 includes an inversion machine, a crane yard, and a transport truck. The inversion machine is arranged between the maintenance area and the setup truck, has two mold support surfaces that are substantially orthogonal, and inverts the molds by way of causing these mold support surfaces to completely rotate. Then, the inversion machine receives and offers molds without changing the attitude of the molds between the inversion machine and the setup truck.

The crane yard includes a crane for suspending and unloading molds for which adjustment is necessary in the maintenance area. The transport truck is arranged to be drivable in the maintenance area between the inversion machine and the crane yard, and has a mold placement surface on which molds are placed in a state in which an open space for a hoisting operation of the crane is available around on the entire lateral circumference of the molds. In addition, the transport truck receives and offers molds between the inversion machine, without changing the attitude of the molds.

Patent Document 1: Japanese Examined Patent Application Publication No. H6-15191

DISCLOSURE OF THE INVENTION

Problems to be Solved by the Invention

Generally, the molds for an injection molding machine are applied with rust-preventive oil on molds that have been exchanged at least on a molding surface thereof, and are stored. When rust occurs on the molding surface of the molds, it leads to being a primary factor for the skin of synthetic resin molded products being rough. On the other hand, with the molds for the injection molding machine, the rust-preventive oil is removed immediately prior to being used so that the rust-preventive oil does not adhere to the synthetic resin molded product.

It is described in the specification of Patent Document 1 that, for old molds, the necessary maintenance is conducted in a maintenance area. However, it is in no way disclosed in the specification of Patent Document 1 in which area application and removal of rust-preventive oil is carried out. It is believed that applying and removing rust-preventive oil is done when the pair of molds is separated by the injection molding machine.

On the other hand, if focusing on the production mode, the production facility according to Patent Document 1 is considered to be ideal for high-volume production in which molds are seldom exchanged within one day, and the exchange time of molds accompanying application and removal of rust-preventive oil, i.e. the interruption time of the injection molding machine, is a short operation time if distributed per one piece of synthetic resin molded product of the same lot.

However, with high-mix low-volume production in which the molds are exchanged at least several times within one day, the exchange time of molds accompanying application and removal of rust-preventive oil comes to have a large ratio if distributed per one piece of synthetic resin molded product of the same lot. In other words, an industrial product production facility and production method having suitably high production efficiency in high-mix low-volume production are demanded. Therefore, the above matter is made the problem of the present invention.

The present invention takes into account of such a problem, and has an object of providing an industrial product production facility and production method having suitably high production efficiency in high-mix low-volume production.

Means for Solving the Problems

In order to achieve the above-mentioned object, the present inventors have found that the production efficiency is improved by simultaneously performing a maintenance process to apply or remove rust-preventive oil while the molding machine is online, and based on this, devised the following novel industrial product production facility and production method.

According to a first aspect, an industrial product production facility includes: a molding machine that molds an industrial product using a pair of molds; a first mold exchanging machine that is disposed to be parallel to a direction in which the pair of molds of the molding machine open and to be adjacent to the molding machine; and a device for automatically opening and closing molds that is disposed to be parallel and adjacent with the first mold exchanging machine.

The industrial product production facility according to the first aspect of the invention includes a molding machine, a first mold exchanging machine, and a device for automatically opening and closing molds. The molding machine molds industrial products using a pair of molds. The first mold exchanging machine is disposed to be parallel to a direction in which the pair of molds of the molding machine open and adjacent to the molding machine. The device for automatically opening and closing molds is disposed to be parallel and adjacent to the first mold exchanging machine.

For example, the pair of molds is an important part of injection molding, and molded articles can be produced by bringing together the pair of molds to form a space (cavity) of the same shape as the desired synthetic resin product. Generally, the molds used in an injection molding machine are configured in a pair by a core (positive mold, also referred to as moveable mold) and a cavity (female mold, also referred to as fixed mold). For example, the fixed mold has a sprue in which molten resin flows, and the sprue is in communication with the space (cavity) through a runner and a gate. In addition, the moveable mold and the fixed mold have a plurality of coolant holes for cooling the molten resin in the cavity.

The injection molding machine may be configured by a mold clamping device and an injection device, and can also include a control panel that controls operation of the mold clamping device and injection device in the configuration. The mold clamping device can chuck the pair of molds, and the injection device can inject molten resin.

The mold clamping device can open and close the pair of molds, and can apply high pressure to the pair of molds while filling with molten resin. Generally, the fixed mold is fixed to the mold clamping device, and the moveable mold is guided in a plurality of divers (guide grooves) and moves with the mold clamping device.

The injection device may have a cylinder as a main component, and the cylinder may dispose a band heater on the outer circumference thereof, and dispose a screw on the inside thereof. A molding material (pellet) is supplied to a base end part of the cylinder from a hopper, and when the screw rotates, the molding material is made to melt and plasticize, and the molten resin can be injected from a nozzle of a leading end thereof. It should be noted that the nozzle is in communication with the sprue while the injection device is online.

The first mold exchanging machine may have a region in which the pair of molds is placed, may dispose a plurality of elongated rollers in this region, and dispose the axial direction of these rollers in a direction parallel to the direction in which the pair of molds relatively advance and retract, and the pair of molds can move in a direction orthogonal to the direction in which the pair of molds relatively advance and retract by causing these rollers to roll.

In addition, the first mold exchanging machine may be a self-propelled car, a pair of rails may be disposed to make a track on the floor on which the first mold exchanging machine is installed, and these rollers may be disposed in a direction parallel to the direction in which the pair of molds relatively advance and retract, whereby the first mold exchanging machine can move in a direction parallel to the direction in which the pair of molds relatively advance and retract.

The first mold exchanging machine may configure the placement surfaces on which the pairs of molds are placed in three parts in at least two parts, and after the pair of molds for which lot production has completed is transferred to the first placement surface, it is immediately transferred to the device for automatically opening and closing molds. On the other hand, the pair of molds for a subsequent lot is placed on the second placement surface and standby, and after the first mold exchanging machine has moved to a predetermined position, the pair of molds for a subsequent lot moves to the injection molding machine, whereby the pair of molds is exchanged.

The device for automatically opening and closing molds can hold the pair of molds to be carried out to the molding machine, and separate so to allow rust-preventive oil at least on the molding surface of these molds to be removed. In other words, the pair of molds for a subsequent lot can transfer to the second placement surface of the first mold exchanging machine.

In a case of the device for automatically opening and closing molds separating at least the molding surfaces of the pair of molds, other maintenance work on molds are included in addition to performing work to remove rust-preventive oil, including work to apply rust-preventive oil, work to confirm operation of a pair of molds, and the like while the device for automatically opening and closing molds is separating.

For example, for synthetic resin products, it is necessary to provide an opening for which formation is difficult only by a pair of molds, and in this case, an operation is necessary to confirm operation of a cylinder that drives a shaft projects inside a cavity before the production.

For the device for automatically opening and closing molds to separate so as to allow rust-preventive oil at least on the molding surfaces of the pair of molds to be removed means that the pair of molds separate sufficiently, and means to separate to an extent that the operator can enter between the pair of molds and work. For example, a bumper is approximately 1.8 meters long, and the pair of molds have a width of at least that; therefore, the operator is able to enter between the pair of molds and work to remove rust-preventive oil.

Similarly, the device for automatically opening and closing molds separating so as to allow rust-preventive oil to be applied on the molding surfaces of the pair of molds means that the pair of molds separate sufficiently, and means to separate to an extent that the operator can enter between the pair of molds and work.

The industrial product production facility according to the first aspect of the invention has been made so that a conventional injection molding machine opens the pair of molds, and an operator performs work to remove or apply rust-preventive oil on the molding surface of molds with the device for automatically opening and closing molds. In other words, an operation to remove or apply rust-preventive oil on the molding surfaces of the molds is made possible without interrupting the injection molding machine.

The industrial product production facility according to the first aspect of the invention can provide an industrial product production facility having suitably high production efficiency in high-mix low-volume production, by performing maintenance work on a pair of molds with a device for automatically opening and closing molds while the molding machine is online.

According to a second aspect, in the industrial product production facility as described in the first aspect, a mold standby stand having a function of heating the pair of molds is made to be parallel and adjacent with the first mold exchanging machine, and is disposed in a vicinity of the device for automatically opening and closing molds.

The mold standby stand may have a region in which the pair of molds is placed, may dispose a plurality of elongated rollers in this region, and dispose the axial direction of these rollers in a direction parallel to the direction in which the pair of molds relatively advance and retract, and the pair of molds can move in a direction orthogonal to the direction in which the pair of molds relatively advance and retract by causing these rollers to roll.

For example, after a pair of molds for which lot production has completed has been transferred to the first placement surface of the first mold exchanging machine, the pair of molds for a subsequent lot may standby with the device for automatically opening and closing molds. In this case, the exchanging time of the pair of molds can be shortened by transferring the pair of molds on the mold standby stand to the device for automatically opening and closing molds, while the pair of molds for which lot production has completed is temporarily placed on the mold standby stand, and the pair of molds for a subsequent lot is mounted to the injection molding machine.

According to a third aspect, in the industrial product production facility as described in the first or second aspect, the device for automatically opening and closing molds includes a moveable platen that holds one mold among the pair of molds, a fixed platen that holds another mold among the pair of molds, and a ball screw mechanism that causes the moveable platen to approach or retreat relative to the fixed platen.

In the industrial product production facility according to a third aspect of the invention includes, the device for automatically opening and closing molds includes a moveable platen, a fixed platen, and a ball screw mechanism. The moveable platen holds one mold among the pair of molds. The fixed platen holds the other mold among the pair of molds. The ball screw mechanism causes the moveable platen to approach or retreat relative to the fixed platen.

The moveable mold is preferably held in the moveable platen, and the fixed mold is preferably held in the fixed platen. The means that holds the moveable mold and fixed mold in the moveable platen and the fixed platen may be the electromagnetic chucks described later, or may be hydraulic chucks. A plurality of rollers, on which the bottom surface of the moveable mold and the fixed mold are placed and roll, is preferably provided on lower parts of the moveable platen and the fixed platen.

The ball screw mechanism may be configured by the ball screw and ball nut, fixes the ball nut to the moveable platen, and disposes the ball screw to be parallel to a direction in which the moveable platen moves relative to the fixed platen. An output shaft of a motor is connected to an end of the ball screw, and the moveable platen can be made to approach or retreat relative to the fixed platen by driving the motor. In the ball screw mechanism, the ball screw and the ball nut connect via a plurality of bearings; therefore, there is an effect in that the moveable platen can move smoothly.

A pair of slide rails that guide the moveable platen is preferably provided in the floor space on which the moveable platen and fixed platen are placed, and divers (guide shafts) that guide the moveable platen are unnecessary, and it is made easy for an operator to enter the floor space opened by the moveable platen and the fixed platen so long as a ball screw mechanism is installed in the floor space.

According to a fourth aspect, in the industrial product production facility as described in the third aspect, the moveable platen and the fixed platen electromagnetically chuck the pair of molds, respectively.

According to a fifth aspect, the industrial product production facility as described in any one of the first to fourth aspects further includes: a second mold exchanging machine that is disposed to be adjacent to the device for automatically opening and closing molds, causes the pair of molds to move in a direction orthogonal to a direction in which the pair of molds relatively advance and retract, and is able to place the pair of molds thereon and move in a direction parallel to the direction in which the pair of molds relatively advance and retract; and a mold rack that is disposed to be adjacent to the second mold exchanging machine and houses a plurality of pairs of molds, in which the second mold exchanging machine houses in the mold rack the pair of molds which is transferred from the device for automatically opening and closing molds, and a pair of molds to be subsequently used is transferred from the mold rack thereto.

The industrial product production facility according to the fifth aspect of the invention further includes a second mold exchanging machine and a mold rack. The second mold exchanging machine is disposed to be adjacent to the device for automatically opening and closing molds, and causes the pair of molds to move in a direction orthogonal to the direction in which the pair of molds relatively advance and retract. In addition, the second mold exchanging machine places the pair of molds thereon and is able to move in a direction parallel to the direction in which the pair of molds relatively advance and retract.

Therefore, with the second mold exchanging machine, the pair of molds is transferred from the device for automatically opening and closing molds to be housed in the mold rack. In addition, with the second mold exchanging machine, the pair of molds to be subsequently used is transferred from the mold rack.

The second mold exchanging machine may have a region in which the pair of molds is placed, may dispose a plurality of elongated rollers in this region, and dispose the axial direction of these rollers in the direction parallel to the direction in which the pair of molds relatively advance and retract, whereby the pair of molds can move in a direction orthogonal to the direction in which the pair of molds relatively advance and retract by causing these rollers to roll.

In addition, the second mold exchanging machine may be a self-propelled car, may dispose a pair of rails to make a track on the floor on which the second mold exchanging machine is installed, and may dispose these rails in, a direction parallel to the direction in which the pair of molds relatively advance and retract. Moreover, the second mold exchanging machine can be moved in a direction parallel to the direction in which the pair of molds relatively advance and retract.

The mold rack ideally houses a plurality of pairs of molds to be parallel and aligned with the rails. In addition, a desired pair of molds can be sent and received by the second mold exchanging machine. The mold rack can also be configured in two tiers, by providing to the second mold exchanging machine a lift that places the pair of molds thereon and raises and lowers.

The industrial product production facility according to the fifth aspect of the invention may have a first route in which a pair of molds move from the molding machine, to the device for automatically opening and closing molds, to the second mold exchanging machine, to the mold rack, may have a second route in which a pair of molds moves from the mold rack, to the second mold exchanging machine, to the device for automatically opening and closing molds, to the molding machine, may have a first bypass route in which a pair of molds moves from the first mold exchanging machine to the mold standby stand, may have a second bypass route in which a pair of molds moves from the second mold exchanging machine to the mold standby stand, and the pair of molds can proceed via a plurality of route corresponding to the production number, which differs for every lot.

According to a sixth aspect, an industrial product production method includes: a molding step of producing an industrial product using a molding machine utilizing a pair of molds; an exchange step of exchanging an old pair of molds after use using a first mold exchanging machine; a setting step of setting in the molding machine, using the first mold exchanging machine, a new pair of molds that have been warmed by a mold standby stand having a function of heating the pair of molds; and a maintenance step of opening the old pair of molds after use using a device for automatically opening and closing molds, and maintaining.

The industrial product production method according to the sixth aspect of the invention can drastically improve the rate of operation of the production facility, in a case of aiming to efficiently produce a small lot of industrial product. In addition, since there is a function of warming the molds in the mold standby stand, a molding machine in which molds have been changed can be used smoothly.

According to a seventh aspect, in the industrial product production method as described in the sixth aspect, the maintenance step includes: a removal step of removing rust-preventive oil at least on a molding surface of the pair of molds, while the device for automatically opening and closing molds is holding and separating the pair of molds to be carried out to the molding machine; and an application step of applying rust-preventive oil on the molding surface of the pair of molds, while the device for automatically opening and closing molds is holding and separating the pair of molds to be conveyed from the molding machine.

According to an eighth aspect, in the industrial product production method as described in the sixth or seventh aspect, the maintenance step includes an operation confirmation step of opening a new pair of molds using the device for automatically opening and closing molds, and inspecting whether the pair of molds perform a predetermined correct operation.

According to a ninth aspect, the industrial product production method as described in any one of the sixth to eighth aspects, further includes: a second mold exchanging machine that is disposed to be adjacent to the device for automatically opening and closing molds, causes the pair of molds to move in a direction orthogonal to a direction in which the pair of molds relatively advance and retract, and is able to place the pair of molds thereon and move in a direction parallel to the direction in which the pair of molds relatively advance and retract; and a mold rack that is disposed to be adjacent to the second mold exchanging machine and houses a plurality of pairs of molds, in which the method further includes: a housing step of transferring the pair of molds from the device for automatically opening and closing molds to house the pair of molds in the mold rack, using the second mold exchanging machine; and a supply step of transferring a pair of molds to be subsequently used from the mold rack to the second mold exchanging machine using the second mold exchanging machine.

Effects of the Invention

An industrial product production facility according to the present invention can provide an industrial product production facility having suitably high production efficiency in high-mix low-volume production, by performing maintenance work on a pair of molds with a device for automatically opening and closing molds while the molding machine is online.

An industrial product production method according to the present invention can drastically improve the rate of operation of a production facility in a case of aiming to efficiently produce industrial products in small lots. In addition, since there is a function of warming molds in a mold standby stand, a molding machine in which molds have been changed can be used smoothly.

Figure 1:
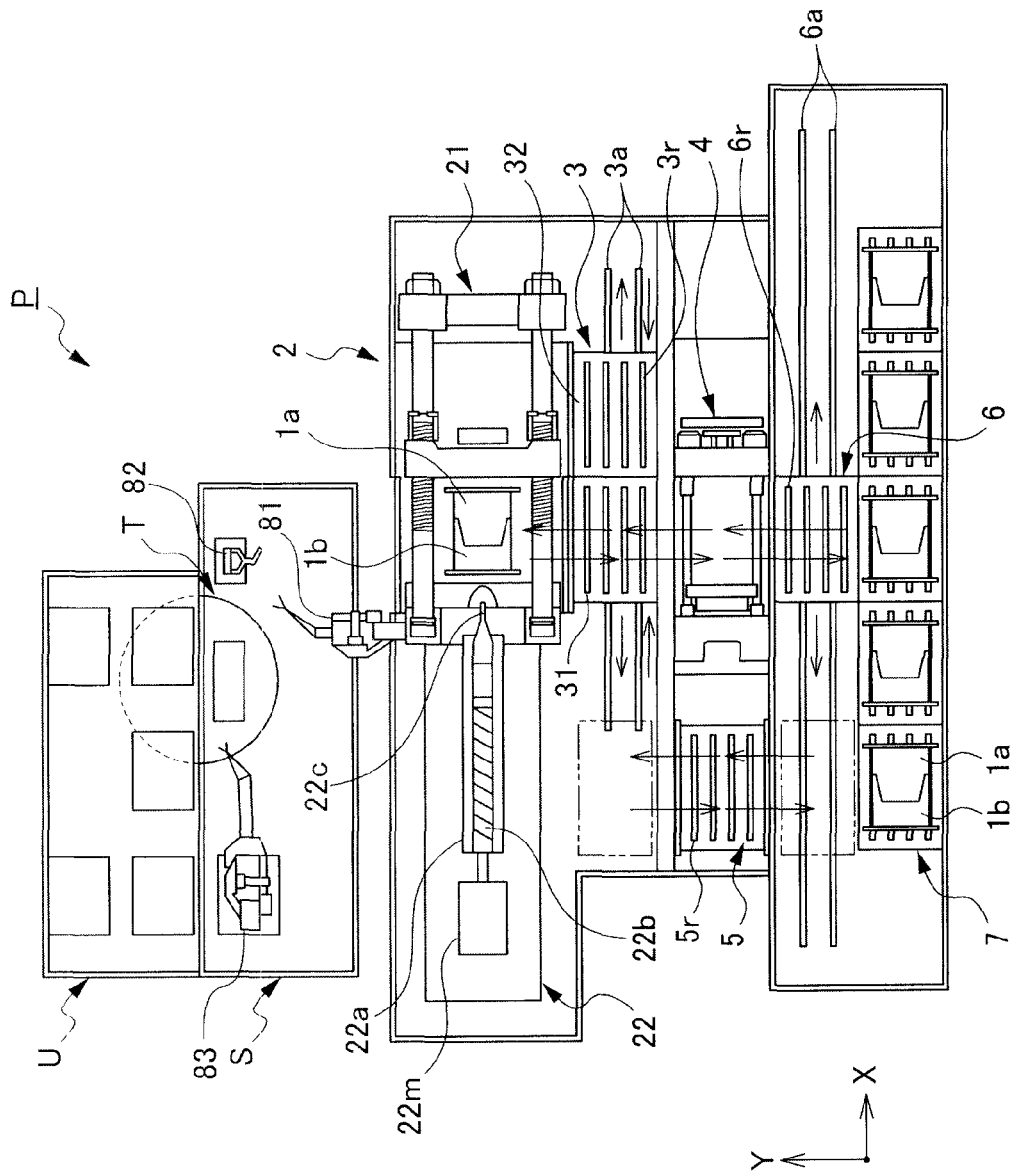
FIG. 1 is a planar arrangement showing one embodiment of a production facility according to the present invention.

EXPLANATION OF REFERENCE NUMERALS 1a, 1b pair of molds
2 injection molding machine (molding machine)
3 first mold exchanging machine
4 device for automatically opening and closing molds
P production facility

PREFERRED MODE FOR CARRYING OUT THE INVENTION

Hereinafter, modes for carrying out the present invention will be explained while referring to the drawings.

Figure 2:
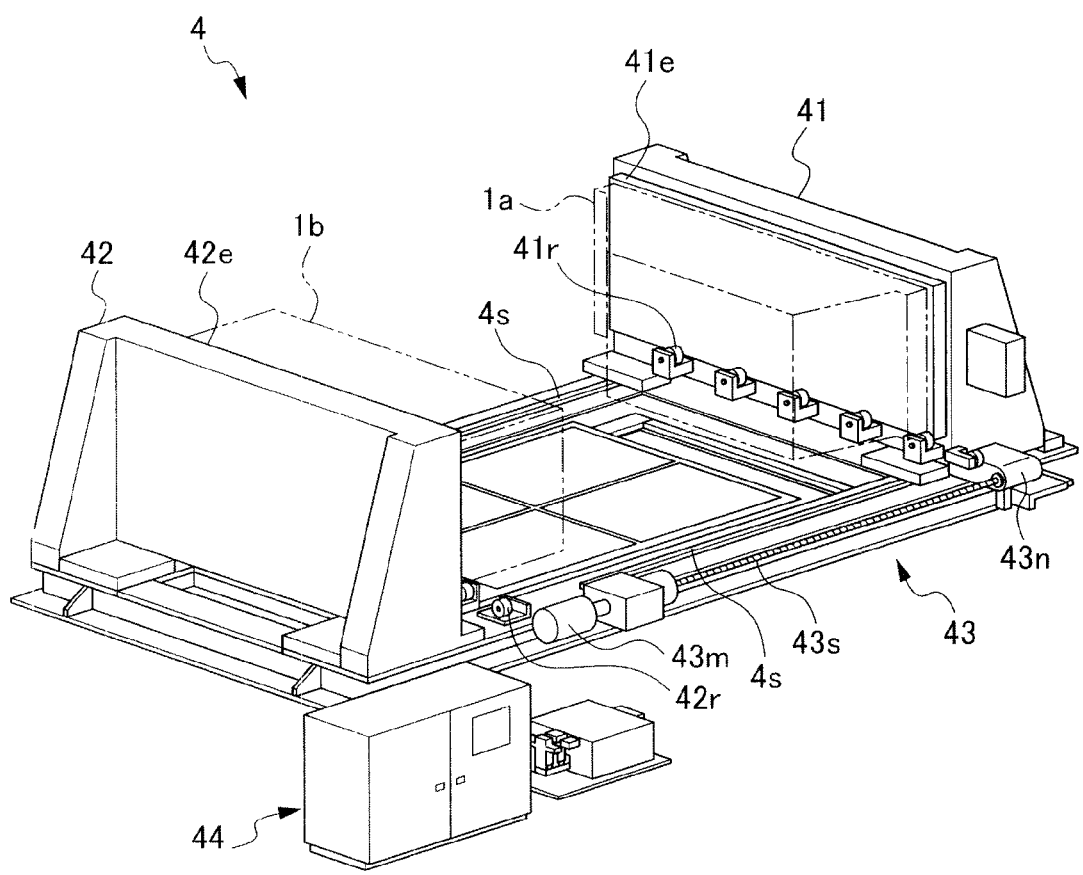
FIG. 2 is a perspective view of a device for automatically opening and closing molds provided in the production facility of the embodiment.
Figure 3:
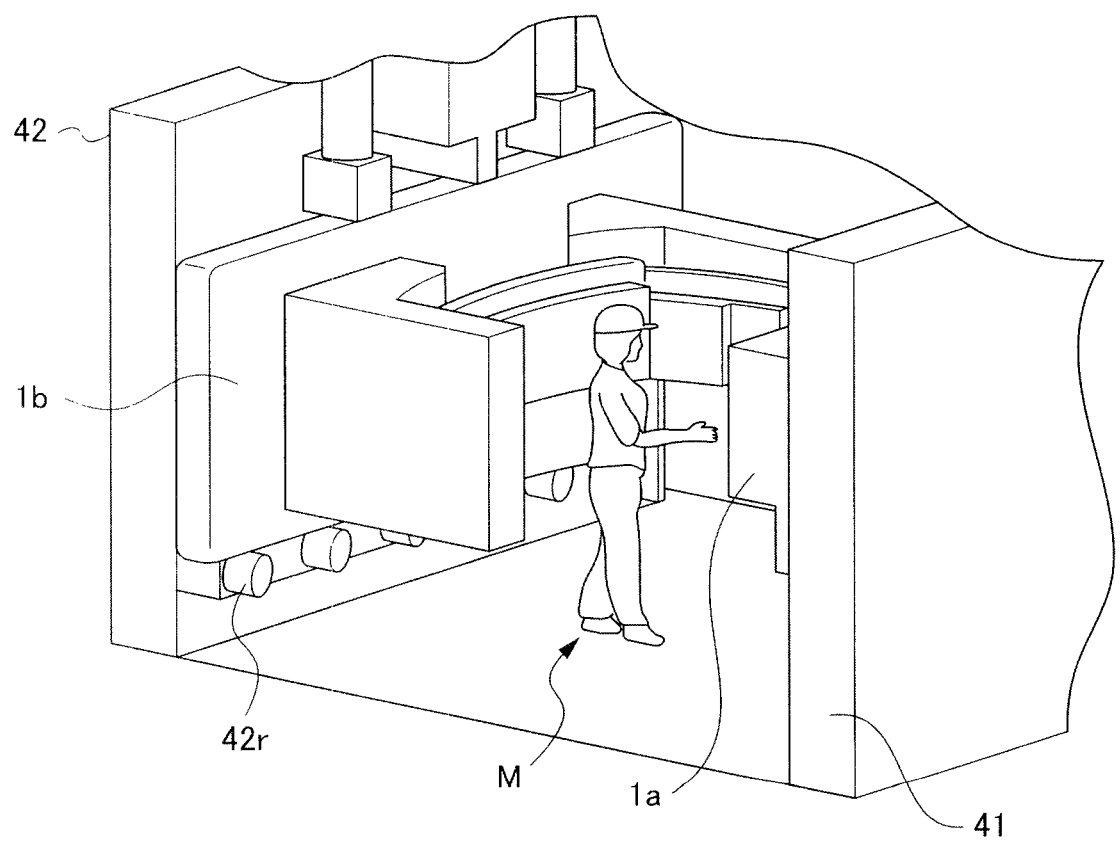
FIG. 3 is a perspective view in which the device for automatically opening and closing molds provided in the production facility of the embodiment is partially enlarged.
Figure 4:
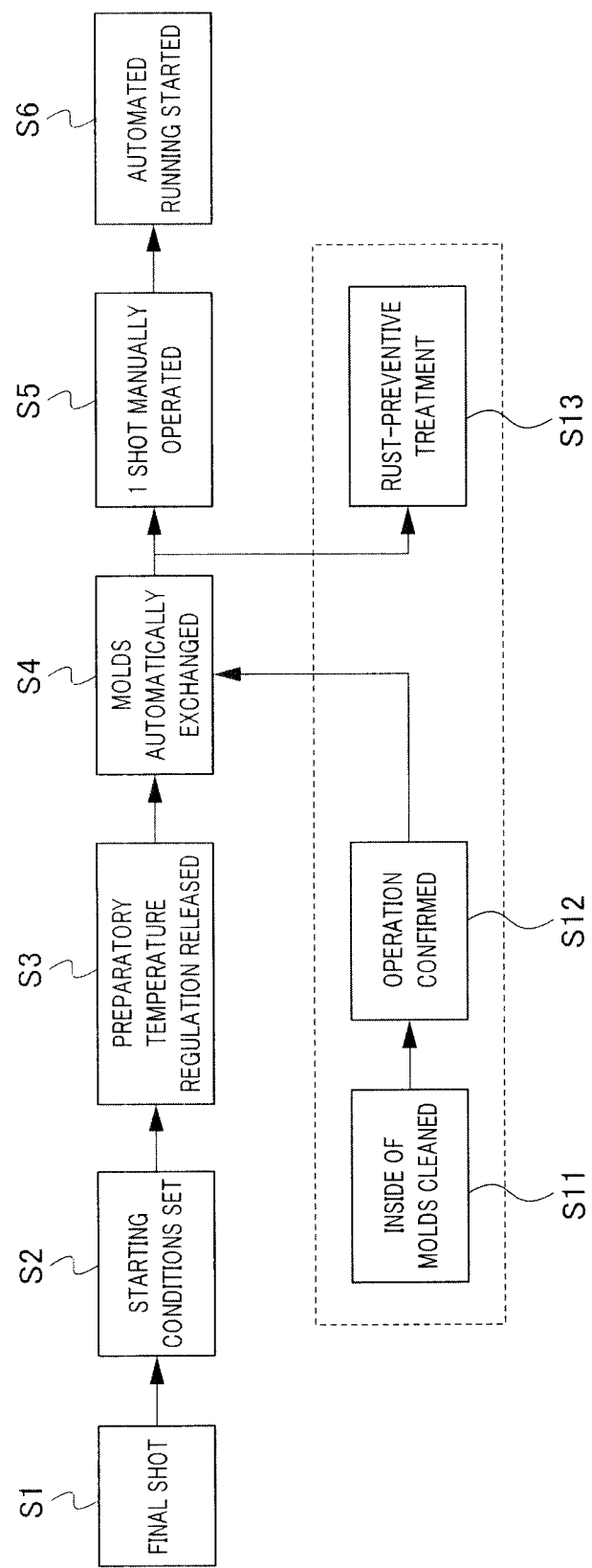
FIG. 4 is a process chart of the production facility of the embodiment.

FIG. 1 is a planar arrangement showing an embodiment of a production facility according to the present invention. FIG. 2 is a perspective view of a device for automatically opening and closing molds provided in the production facility of the embodiment. FIG. 3 is a perspective view in which the device for automatically opening and closing molds provided in the production facility of the embodiment is partially enlarged. FIG. 4 is a process chart of the production facility of the embodiment.

First, a configuration of the production facility according to the embodiment of the present invention will be explained. In FIG. 1, a production facility P includes an injection molding machine 2, a first mold exchanging machine 3, and a device 4 for automatically opening and closing molds. The injection molding machine 2 molds synthetic resin articles using a pair of molds 1a and 1b. The injection molding machine 2 is an injection molding machine of horizontal type.

In FIG. 1, the first mold exchanging machine 3 causes the pair of molds 1a and 1b to move in a direction orthogonal to a direction in which the pair of molds 1a and 1b relatively advance and retract. In addition, the first mold exchanging machine 3 places a pair of molds thereon and is able to move in a direction parallel to the direction in which the pair of molds 1a and 1b relatively advance and retract. The device 4 for automatically opening and closing molds is disposed to be adjacent to the first mold exchanging machine 3 and opposing the injection molding machine 2.

In FIGS. 1 and 2, the device 4 for automatically opening and closing molds holds the pair of molds 1a and 1b to be carried out to the injection molding machine 2, and can separate so as to allow removal of rust-preventive oil at least on the molding surfaces of the pair of molds 1a and 1b. In addition, the device 4 for automatically opening and closing molds holds the pair of molds 1a and 1b being conveyed from the injection molding machine 2, and can separate so as to allow rust-preventive oil to be applied to the molding surfaces of the pair of molds 1a and 1b.

In FIG. 1, the one mold 1a is a moveable mold, and the other mold 1b is a fixed mold. A molded article can be produced by bringing together the mold 1a and the mold 1b, and forming a space (cavity) of the same shape as a desired synthetic resin article. The mold 1b has a sprue (not illustrated) in which molten resin flows, and the sprue is in communication with a space (cavity) via a runner and gate. In addition, the mold 1a and the mold 1b have coolant holes (not illustrated) for cooling molten resin in the cavity.

In FIG. 1, the injection molding machine 2 may be configured by a mold clamping device 21 and an injection device 22, and can also include in the configuration of the injection molding machine 2 a control panel (not illustrated) that controls operations of the mold clamping device 21 and the injection device 22. The mold clamping device 21 can chuck the pair of molds 1a and 1b, and the injection device 22 can inject molten resin.

In FIG. 1, the mold clamping device 21 can open and close the pair of molds 1a and 1b, and can apply high pressure to the pair of molds 1a and 1b when filling with molten resin. The fixed mold 1b is fixed to the mold clamping device 21, and the moveable mold 1a is guided in a plurality of divers, and moves with the mold clamping device 21.

In FIG. 1, the injection device 22 has a cylinder 22a as a main component. The cylinder 22a disposes a band heater (not illustrated) on an outer circumference. In addition, a screw 22b is disposed inside the cylinder 22a. Molding material is supplied from a hopper, which is not illustrated, to a base end part of the cylinder 22a, and when the screw 22b is rotated by a motor 22m, the molding material is made to melt and plasticize, and the molten resin can be injected from a nozzle 22c of a leading end thereof. It should be noted that, while the injection device 22 is online, the nozzle 22c is in communication with the sprue.

In FIG. 1, the first mold exchanging machine 3 has a region on which the pair of molds 1a and 1b are placed, and a plurality of elongated rollers 3r are disposed in this region. The axial direction of the plurality of rollers 3 is disposed in a direction (hereinafter referred to as X direction) parallel to the direction in which the pair of molds 1a and 1b relatively advance and retract, and the pair of molds 1a and 1b can be moved in a direction (hereinafter referred to as Y direction) orthogonal to the direction in which the pair of molds 1a and 1b relatively advance and retract by causing these rollers 3r to roll.

In FIG. 1, the first mold exchanging machine 3 is a self-propelled car. A pair of rails 3a and 3a is disposed to make a track on the floor on which the first mold exchanging machine 3 is installed. The pair of rails 3a and 3a is disposed with a longitudinal direction thereof in the X direction, and allows the first mold exchanging machine 3 to move in the X direction.

Next, operations of the production facility according to the embodiment of the present invention will be explained.

In FIG. 1, the first mold exchanging machine 3 configures placement surfaces on which the pair of molds 1a and 1b is placed in two parts. In addition, after a pair of molds 1a and 1b for which lot production has completed is transferred to a first placement surface 31, it is immediately transferred to the device 4 for automatically opening and closing molds. On the other hand, a pair of molds 1a and 1b for a subsequent lot is placed on a second placement surface 32 and standby, and after the first mold exchanging machine 3 has moved to a predetermined position in the Y direction, the pair of molds 1a and 1b for a subsequent lot moves to the injection molding machine 2, whereby the pair of molds 1a and 1b are exchanged.

Referring to FIGS. 2 and 3, the device 4 for automatically opening and closing molds holds a pair of molds 1a and 1b to be carried out to the injection molding machine 2, and separates so as to allow removal of rust-preventive oil at least on molding surfaces of these molds 1a and 1b. In other words, a pair of molds 1a and 1b for a subsequent lot can be transferred to the second placement surface 32 of the first mold exchanging machine 3.

Referring to FIG. 3, the device 4 for automatically opening and closing molds can sufficiently separate so as to allow removal of rust-preventive oil on the molding surfaces of the pair of molds 1a and 1b. As shown in FIG. 3, it separates to an extent that allows an operator M to enter between the pair of molds 1a and 1b and work. The operator M enters between the molds 1a and 1b, and thus work to remove rust-preventive oil is possible.

Similarly, when referring to FIG. 3, the device 4 for automatically opening and closing molds sufficiently separates so as to allow application of rust-preventive oil on molding surfaces of the pair of molds 1a and 1b. As shown in FIG. 3, it separates to an extent that allows an operator M to enter between the pair of molds 1a and 1b and work. The operator M enters between the molds 1a and 1b, and thus work to apply rust-preventive oil is possible.

In this way, the production facility P according to the embodiment of the present invention has been made so that a conventional injection molding machine 2 opens the pair of molds 1a and 1b, and an operator performs work to remove or apply rust-preventive oil on the molding surface of molds with the device 4 for automatically opening and closing molds. In other words, work to remove or apply rust-preventive oil on the molding surfaces of molds has been made possible without stopping the injection molding machine 2.

The production facility P according to the embodiment of the present invention can provide an industrial product production facility having suitably high production efficiency in high-mix low-volume production, by applying or removing rust-preventive oil on the pair of molds 1a and 1b with the device 4 for automatically opening and closing molds while the injection molding machine 2 is online.

Next, configurations and operations of the production facility according to the embodiment of the present invention will be further explained. In FIG. 1, the production facility P includes a mold standby stand 5 that is disposed in parallel with the device 4 for automatically opening and closing molds, and on which a pair of molds 1a and 1b is temporarily placed and sends and receives the pairs of molds 1a and 1b with the first mold exchanging machine 3.

In FIG. 1, the mold standby stand 5 also has a function of warming pairs of molds 1a and 1b in order to set the pair of molds 1a and 1b in the injection molding machine 2 next. In particular, it is important to warm the runners provided in the mold 1b to melt the synthetic resin inside.

In FIG. 1, the mold standby stand 5 has a region on which a pair of molds 1a and 1b is placed, and a plurality of elongated rollers 5r is disposed in this region. The axial direction of the plurality of rollers 5r is disposed in a direction parallel to the direction in which the pair of molds 1a and 1b relatively advance and retract, and the pair of molds 1a and 1b can be moved in the Y direction by causing these rollers 5r to roll.

For example, in FIG. 1, after a pair of molds 1a and 1b for which lot production has completed is transferred to the placement surface 31 of the first mold exchanging machine 3, the pair of molds 1a and 1b for a subsequent lot may be standing by in the device 4 for automatically opening and closing molds. In this case, the exchange time of the pairs of molds 1a and 1b can be shortened by temporarily placing the pair of molds 1a and 1b for which lot production has completed on the mold standby stand 5, and transferring the pair of molds 1a and 1b on the mold standby stand 5 to the device 4 for automatically opening and closing molds while the pair of molds 1a and 1b for a subsequent lot are mounted to the injection molding machine 2.

In FIG. 1, the production facility P further includes a second mold exchanging machine 6 and a mold rack 7. The second mold exchanging machine 6 is disposed to be adjacent to the device 4 for automatically opening and closing molds, and causes the pair of molds 1a and 1b to move in a direction orthogonal to the direction in which the pair of molds 1a and 1b relatively advance and retract. In addition, the second mold exchanging machine 6 places the pair of molds 1a and 1b thereof, whereby it becomes possible to move in the Y direction.

In FIG. 1, a pair of molds 1a and 1b is transferred from the device 4 for automatically opening and closing molds to be housed by the second mold exchanging machine 6 in the mold rack 7. In addition, with the second mold exchanging machine 6, a pair of molds 1a and 1b to be used subsequently is transferred from the mold rack 7.

In FIG. 1, the second mold exchanging machine 6 has a region in which the pair of molds 1a and 1b is placed. A plurality of elongated rollers 6r is disposed in this region, the axial direction of the plurality of rollers 6r is disposed in the X direction, and a pair of molds 1a and 1b can be moved in the Y direction by causing these rollers 6r to roll.

In addition, in FIG. 1, the second mold exchanging machine 6 is a self-propelled car. A pair of rails 6a and 6a is disposed to be tracks on the floor on which the second mold exchanging machine 6 is installed. The longitudinal direction of the pair of rails 6a and 6a is disposed in the X direction, and thus the second mold exchanging machine 6 can move in the X direction.

In FIG. 1, the mold rack 7 houses a plurality of pairs of molds 1a and 1b to be aligned in parallel with the pair of rails 6a and 6a. Consequently, a desired pair of molds 1a and 1b can be sent and received with the second mold exchanging machine 6. The mold rack 7 can also be configured in two tiers by providing to the second mold exchanging machine 6 a lift (not illustrated) to place a pair of molds 1a and 1b on and raise and lower.

In FIG. 1, the production facility P according to the embodiment has a first route in which a pair of molds 1a and 1b moves from the injection molding machine 2, to the device 4 for automatically opening and closing molds, to the second mold exchanging machine 6, to the mold rack 7. In addition, the production facility P has a second route in which a pair of molds 1a and 1b moves from the mold rack 7, to the second mold exchanging machine 6, to the device 4 for automatically opening and closing molds, to the injection molding machine 2.

Furthermore, the production facility P according to the embodiment has a first bypass route in which a pair of molds 1a and 1b moves from the first mold exchanging machine 3 to the mold standby stand 5, and has a second bypass route in which a pair of molds 1a and 1b moves from the second mold exchanging machine 6 to the mold standby stand 5. It may have a temporary route of moving from the second mold exchanging machine 6 to the mold standby stand 5, and may have a temporary route of moving from the mold standby stand 5 to the second mold exchanging machine 6. With the production facility P according to the embodiment, the pairs of molds 1a and 1b can proceed via a plurality of routes corresponding to the production number, which differs for every lot.

In FIG. 1, the production facility P according to the embodiment disposes a transfer robot 81 in the vicinity of the injection molding machine 2. The transfer robot 81 holds synthetic resin products molded by the injection molding machine 2, and places them in a product area S. Then, a gate cut robot 82 is installed in the product area S, and the gate cut robot 82 removes burrs of the synthetic resin products.

In FIG. 1, the synthetic resin products for which burrs have been removed are transferred to a turn table T by the transfer robot 81. The turn table T straddles the product area S and a distribution area U, and synthetic resin products are moved to the distribution area U by the turn table T rotating. After quality inspection has been conducted on synthetic resin products in the distribution area U, they are shipped to a subsequent process.

Next, configurations and operations of the device for automatically opening and closing molds according to the embodiment will be explained. Referring to FIG. 2, the device 4 for automatically opening and closing molds includes a moveable platen 41, a fixed platen 42, and a ball screw mechanism 43. The moveable platen 41 holds the mold 1a (moveable mold) among the pair of molds 1a and 1b. The fixed platen 42 holds the mold 1b (fixed mold) among the pair of molds 1a and 1b. The ball screw mechanism 43 can cause the moveable platen 41 to approach or retreat relative to the fixed platen 42.

In FIG. 2, the moveable platen 41 and the fixed platen 42 respectively include electromagnetic chucks 41e and 42e. When current passes through the electromagnetic chuck 41e, the mold 1a can be held by the moveable platen 41 (refer to FIG. 1). When current passes through the electromagnetic chuck 42e, the mold 1b can be held by the fixed platen 42 (refer to FIG. 1).

In FIG. 2, a plurality of rollers 41r and 42r, on which the bottom surface of the mold 1a and the mold 1b are placed and roll, is provided at the lower part of the moveable platen 41 and the fixed platen 42, which allow the pair of molds 1a and 1b to move from the first mold exchanging machine 3 or the second mold exchanging machine 6 (refer to FIG. 1).

In FIG. 2, the ball screw mechanism 43 is configured by a ball screw 43s and a ball nut 43n. The ball nut 43n is fixed to the moveable platen 41. The ball screw 43s disposes the axial direction thereof in parallel to a direction in which the moveable platen 41 moves relative to the fixed platen 42.

In FIG. 2, one end of the ball screw 43s connects to an output shaft of a motor 43m. The moveable platen 41 can be made to approach or retreat relative to the fixed platen 42 by driving the motor 43m. Since the ball screw 43s and the ball nut 43n connect via a plurality of bearings, the ball screw mechanism 43 can smoothly move the moveable platen 41. The speed of the moveable platen 41 or the switching of the electromagnetic chucks 41e and 42e is controlled by a control panel 44, which is shown in FIG. 2.

In FIG. 2, a pair of slide rails 4s and 4s, which guide the moveable platen 41, is provided on the floor on which the moveable platen 41 and fixed platen 42 are installed, whereby a diver (guide shaft) to guide the moveable platen 41 becomes unnecessary, and it becomes easy for the operator M to enter the floor space where the moveable platen 41 and the fixed platen 42 are opened by installing the ball screw mechanism 43 in the vicinity of the floor space.

Next, referring to FIG. 4, the process of operations mainly carried out in the injection molding machine 2 and the process of operations carried out in the device 4 for automatically opening and closing molds will be explained by comparison in 1 lot cycle. It should be noted that the upper stages in FIG. 4 show the process of operations mainly carried out in the injection molding machine 2 in 1 lot cycle, and the lower stages in FIG. 4 show the process of operations carried out in the device 4 for automatically opening and closing molds in 1 lot cycle.

In FIG. 4, when the injection molding machine 2 molds a final synthetic resin product in a lot (Step S1), the molding conditions of a subsequent lot are set (Step S2). Next, preparatory temperature regulation of the pair of molds 1a and 1b is released (Step S3). Then, the pair of molds 1a and 1b is exchanged (Step S4). Next, synthetic resin products of a subsequent lot are molded by manual operation, and it is confirmed that the molding conditions are correct (Step S4). When the molding conditions are confirmed to be correct, automatic operation of the injection molding machine 2 is initiated (Step S4).

On the other hand, the inside of the molds is cleaned while the device 4 for automatically opening and closing molds is holding and separating the pair of molds 1a and 1b (Step S11). More specifically, rust-preventive oil on the molding surfaces of the pair of molds 1a and 1b is removed in Step S11 (refer to FIGS. 2 and 3). Next, operation of the pair of molds 1a and 1b is confirmed (Step S12). Then, the pair of molds 1a and 1b is mounted to the injection molding machine 2.

In addition, the pair of molds 1a and 1b thus exchanged undergo rust-preventive treatment (Step S13). More specifically, in Step S13, rust-preventive oil is applied on the molding surfaces of the pair of molds 1a and 1b while the device 4 for automatically opening and closing molds is holding and separating the pair of molds 1a and 1b (refer to FIGS. 2 and 3.

In this way, the production method of synthetic resin molded products according to the embodiment of the present invention can shorten the exchange time of pairs of molds 1a and 1b by applying or removing rust-preventive oil on pairs of molds 1a and 1b with the device 4 for automatically opening and closing molds while the injection molding machine 2 is online. For an actual measured value, the average mold exchange time could be shortened by 5 minutes from about 19 minutes to about 14 minutes.

Automotive body components such as bumpers or instrument panels, as well as exterior panel components of motorcycles are included among the synthetic resin molding products applied to the present invention. In addition, the industrial products applied to the present invention are not limited to synthetic resin molded products, and also include aluminum die casted products, engine crankcases, and aluminum casted frames of motorcycles.

The invention claimed is:

1. An industrial product production facility, comprising:
a molding machine that molds an industrial product using a pair of molds;
a first mold exchanging machine that is disposed to be parallel to a direction in which the pair of molds of the molding machine open and to be adjacent to the molding machine; and
a device for automatically opening and closing molds that is disposed to be parallel and adjacent with the first mold exchanging machine;
wherein a mold standby stand having a function of heating the pair of molds is made to be parallel and adjacent with the first mold exchanging machine, and is disposed in a vicinity of the device for automatically opening and closing molds; and
a second mold exchanging machine that is disposed to be adjacent to the device for automatically opening and closing molds, causes the pair of molds to move in a direction orthogonal to a direction in which the pair of molds relatively advance and retract, and is able to place the pair of molds thereon and move in a direction parallel to the direction in which the pair of molds relatively advance and retract; and
a mold rack that is disposed to be adjacent to the second mold exchanging machine and houses a plurality of pairs of molds; and
a first bypass route for the pair of molds to move from the first mold exchanging machine to the mold standby stand and vice versa and a second bypass route for the pair of molds to move from the second mold exchanging machine to the mold standby stand and vice versa;
wherein the second mold exchanging machine houses in the mold rack the pair of molds which is transferred from the device for automatically opening and closing molds, and a pair of molds to be subsequently used is transferred from the mold rack thereto.

2. The industrial product production facility according to claim 1, wherein the device for automatically opening and closing molds includes a moveable platen that holds one mold among the pair of molds, a fixed platen that holds another mold among the pair of molds, and a ball screw mechanism that causes the moveable platen to approach or retreat relative to the fixed platen.

3. The industrial product production facility according to claim 2, wherein the fixed platen and the moveable platen electromagnetically chuck the pair of molds, respectively.

* * * * *